US010650331B1

(12) United States Patent
Mossoba et al.

(10) Patent No.: US 10,650,331 B1
(45) Date of Patent: May 12, 2020

(54) SMART SEAT THAT CAN RECEIVE PAYMENTS

(71) Applicant: Capital One Services, LLC, McLean, VA (US)

(72) Inventors: Michael Mossoba, Arlington, VA (US); Joshua Edwards, Philadelphia, PA (US); Salik Shah, Washington, DC (US); Abdelkader M'Hamed Benkreira, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/363,075

(22) Filed: Mar. 25, 2019

(51) Int. Cl.
*G06Q 10/02* (2012.01)
*G06Q 20/34* (2012.01)
*G07C 9/29* (2020.01)

(52) U.S. Cl.
CPC ........... *G06Q 10/02* (2013.01); *G06Q 20/352* (2013.01); *G07C 9/29* (2020.01)

(58) Field of Classification Search
CPC ..... G06Q 10/02; G06Q 20/352; G07C 9/0119
USPC ........................................................... 705/5
See application file for complete search history.

(56) References Cited

U.S. PATENT DOCUMENTS

| 2010/0133870 A1* | 6/2010 | Kan .................... B60N 2/01516 296/65.18 |
| 2011/0109594 A1* | 5/2011 | Marcus ............... G06F 3/04886 345/178 |
| 2014/0279200 A1* | 9/2014 | Hosein ............... G06Q 30/0601 705/26.7 |
| 2015/0120340 A1* | 4/2015 | Cheatham, III ....... G06Q 10/02 705/5 |
| 2018/0234707 A1* | 8/2018 | Pujia .................. H04N 21/2146 |
| 2018/0279797 A1* | 10/2018 | Havell ...................... A63J 5/00 |

FOREIGN PATENT DOCUMENTS

WO         WO-0184504 A2 * 11/2001 ............. G06Q 10/02

OTHER PUBLICATIONS

Barth et. al., Intelligent Transportation System Architecture for a Multi-Station Shared Vehicle System, 2000 IEEE Intelligent Transport Systems (Year: 200).*
Disney, "Unlock the Magic with Your MagicBand or Card", Walt Disney World Resort, https://disneyworld.disney.go.com/plan/my-disney-experience/bands-cards/, 3 pages, printed May 10, 2018.

* cited by examiner

*Primary Examiner* — Kevin H Flynn
*Assistant Examiner* — Emmett K. Walsh
(74) *Attorney, Agent, or Firm* — DLA Piper LLP (US)

(57) ABSTRACT

In one aspect, the present disclosure relates to a method for controlling access to a seat based on payments. The method can include: reading, at a card reader located at a seat, payment information from a payment card; validating the payment information; sending a control signal to a locking device to unlock the seat; detecting that an occupant left the seat; and in response to detecting that the occupant left the seat, sending a control signal the locking device to lock the seat.

18 Claims, 6 Drawing Sheets

US 10,650,331 B1

SMART SEAT THAT CAN RECEIVE PAYMENTS

BACKGROUND

Many event spaces or venues have seating for spectators. Examples include movie theatres, concert halls, stadiums, and arenas. For a particular event, a spectator may have the option of purchasing a general admission ticket or a reserved seating ticket. With general admission, the spectator is free to choose any available seat and may be allowed to change seats during the event. However, with general admission, the spectator risks losing their seat if they leave it even for only a few minutes. With reserved seating, a spectator is guaranteed not to lose their seat during the event, however they may not be permitted to move to different seats, even if those seats are empty.

SUMMARY

According to one aspect, the present disclosure relates to a method for controlling access to a seat based on payments. The method can include: reading, at a card reader located at a seat, payment information from a payment card; validating the payment information; sending a control signal to a locking device to unlock the seat; detecting that an occupant left the seat; and in response to detecting that the occupant left the seat, sending a control signal to the locking device to lock the seat.

In some embodiments, validating the payment information can include transmitting the payment information to a server device. In some embodiments, sending a control signal to a locking device to unlock the seat can include generating an electronic control signal by a controller located at the seat. In some embodiments, sending a control signal to a locking device to unlock the seat can include sending the lock control signal to an electromechanical locking device coupled to the seat. In some embodiments, sending a control signal to a locking device to unlock the seat can include sending the lock control signal to an electromagnetic locking device coupled to the seat. In some embodiments, reading the payment information can include reading the payment information using a contactless card reader.

In some embodiments, the method can include, in response to validating the payment information, notifying a server device that the seat is occupied. In some embodiments, the method can include, in response to detecting that an occupant left the seat, activating a visual indicator to indicate that the seat is reserved. In some embodiments, the method can include, in response to validating the payment information, sending a command to a motor located on the seat to cause the seat to unfold.

According to another aspect, the present disclosure relates to a method that can include: setting a state of a seat to an available state; reading, at a card reader located at the seat, payment information from a payment card; validating the payment information; in response to validating the payment information, changing the state of the seat to an occupied state; detecting that an occupant left the seat; and in response to detecting that the occupant left the seat, changing the state of the seat to a reserved state.

In some embodiments, the seat can include a locking device, wherein the locking device is activated when the state is the available state or the reserved state. In some embodiments, the seat can include a visual indicator, wherein the visual indicator is activated when the state is the reserved state. In some embodiments, the method can include: determining that a first event is scheduled to end; in response to determining that the first event is scheduled to end, changing the state of the seat to a waiting state; determining that a second event is scheduled to start; and in response to determining that the second event is scheduled to start, changing the state of the seat to the available state.

According to another aspect, the present disclosure relates to a system for controlling access to a seat based on payments. The system can include: a card reader attached to a seat, the card reader configured to read payment information from payment cards; a locking device configured to lock the seat; a sensor configured to detect when the seat is occupied; and a controller. The controller can be configured to: receive payment card information from the card reader; validate the payment information; send a control signal to the locking device to unlock the seat; detect, using the sensor, that an occupant left the seat; and in response to detecting that the occupant left the seat, sending a control signal to the locking device to lock the seat.

In some embodiments, the system can include a touchscreen device configured to display products or services that can be purchased using the validated payment information. In some embodiments, the system can include a switch configured to disable the touchscreen device. In some embodiments, the locking device can be one of an electromechanical locking device or an electromagnetic locking device.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

Figure 1A:
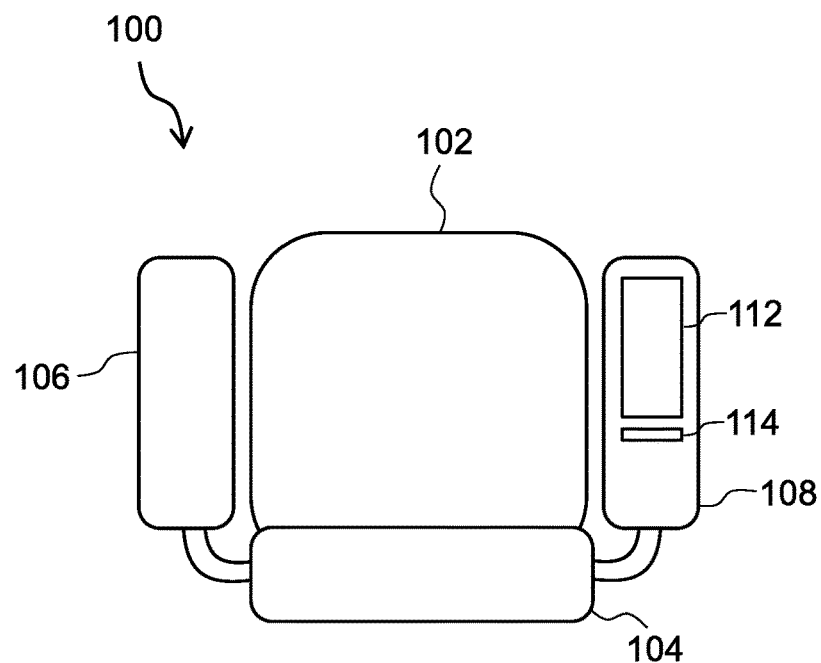
FIG. 1A is a top view of a so-called "smart seat," according to some embodiments of the present disclosure.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure relate to a so-called "smart seat" that can be electronically locked and unlocked using payment cards. Prior to the start of an event, all seats in a venue may be locked. A spectator can choose any available seat in the venue and unlock their preferred seat by swiping or tapping a payment card. After the payment card is validated, the seat can unlock, allowing the spectator to sit down. The payment card may be associated with that seat for the duration of the event. If a seat occupant leaves their seat during an event, the seat automatically re-locks and, for the duration of the event, can only be unlocked using the same payment card. In some embodiments, a smart seat can include a light or other visual indicator to notify others that the seat is reserved. In some embodiments, a smart seat can include a touchscreen or other type of user input device via which the seat occupant can purchase food or other goods or services offered by the venue. Embodiments of the smart seat provides the flexibility of general admission with the peace of mind afforded by reserved seating.

In some embodiments, a smart seat can be reserved ahead of time via an app or website. The seat will remain locked until the same payment card used within the app/website is swiped/tapped at the seat. In some embodiments, a person can change seats during an event by swiping/tapping their card on any available seat. The newly chosen seat is unlocked and the previous seat associated with the card can be automatically locked and changed to an available status. If the price of the old and new seats is different, the payment card can be automatically charged (or debited) the difference.

In some embodiments, a venue may have a plurality of smart seats communicably coupled to a server device. The server device can manage the availability and pricing of smart seats within a venue. For example, the server device can automatically adjust seat prices based on real-time seat reservation or occupancy information. In some embodiments, the server device can adjust seat prices based on one or more external data sources. For example, if a venue has outdoor seating, the server device may monitor an external weather service and adjust the price of seating during inclement weather. As another example, the server device may increase the price of covered seats and decrease the price of uncovered seats when it is raining. In some embodiments, the sever device can access the venue's event schedule to determine when events start and end times. When an event is scheduled to end, the server device may send control signals to all of the smart seats causing them to re-lock.

In some embodiments, the smart seat can be used for transportation-related applications, such as on airplanes and trains. For example, plane/train passengers could buy general admission tickets and then select an available seat when they board or prior to boarding. In some embodiments, some passengers may be charged a fee (in addition to the price of their ticket) for their seat, while other passengers are not charged an additional fee. For example, the first N passengers to choose a seat may be charged while the remainder are not. As another example, seats that have more room, that are located close to an exit, or that are otherwise generally desirable may require payment, whereas other seats do not.

In some embodiments, an augmented reality (AR) app can be provided to locate available seats within a venue. For example, when a user of the app points their smartphone camera to a section of seats, reserved seats may be overlaid in one color whereas available seats may be overlaid with a different color. The AR app may communicate with the server device to determine which seats are reserved or available.

Figure 1B:
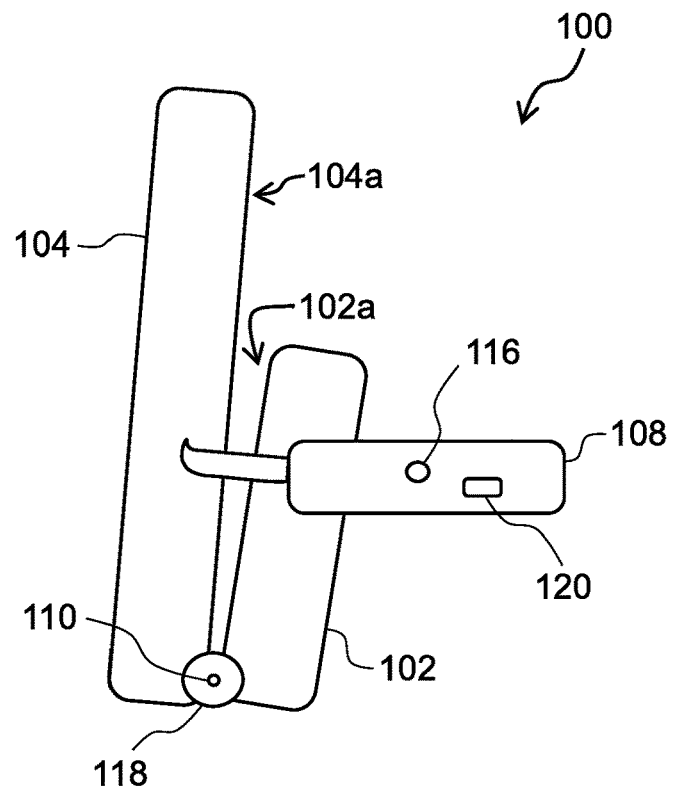
FIG. 1B is a side view of a smart seat, according to some embodiments of the present disclosure.

FIGS. 1A and 1B show a smart seat, according to some embodiments of the present disclosure. Illustrative smart seat 100 can include a seat bottom 102, a backrest 104, a first (or "left") armrest 106, and a second or ("right") armrest 108. The smart seat 100 can also include a user input device 112, a card reader 114, and a reserved indicator 116. In some embodiments, the seat 100 can include a switch 120 for enabling or disabling user input device 112. In the embodiment shown, user input device 112 and card reader 114 can be located on a top surface of right armrest 108, and reserved indicator 116 and switch 120 can be located on one side of right armrest 108. A skilled artisan will understand that any or all of these elements could be located on left armrest 106 or elsewhere on or near the smart seat 100.

As shown in FIG. 1B, smart seat 100 can include a hinge 110 that connects the seat bottom 102 to the backrest 104 and allows these sections of the seat to fold together such that a person would not be able to sit (at least not comfortably) in the seat 100. In some embodiments, hinge 110 may be configured to allow the seat to "fold up," meaning that seat bottom 102 can rotate upward toward the backrest 104 such that a top planar surface 102a of seat bottom 102 is proximate to and substantially parallel with a front planar surface 104a of backrest 104, as shown in FIG. 1B. In some embodiments, hinge 110 may be configured to allow the seat to "fold down," such that backrest 104 can rotate downward toward the seat bottom 102. In some embodiments, hinge 110 may be spring-loaded to force seat 100 in a folded position when the seat is unoccupied. In some embodiments, seat 100 may include a motor coupled to the seat bottom 102 and/or backrest 104. The motor can drive the rotation of the seat bottom or backrest to cause the seat to fold and unfold. In some embodiments, seat motor can receive commands from an electronic controller located within or nearby the seat 100, as discussed further below in the context of FIG. 3.

Smart seat 100 can include a locking device 118 to mechanically lock the seat in a folded position, such as in the position shown in FIG. 1B. The locking device 118 may be selected so as to resist the force of a typical person attempting to forcibly unfold the seat. Locking device 118 may be an electromagnetic or electromechanical device controlled by an electronic controller within or nearby the seat 100, as discussed further below in the context of FIG. 3. In some embodiments, locking device 118 can be provided as an electromagnetic lock having an electromagnet and an armature plate. In some embodiments, locking device 118 may correspond to a motor within the seat 100 that controls rotation of the seat bottom 102 and/or backrest 104. In addition to driving seat rotation, the motor may provide sufficient mechanical impedance to effectively lock the seat in a folded position.

Smart seat 100 may include a sensor (not shown) to detect when the occupant stands up or otherwise leaves the seat. For example, in embodiments where seat bottom 102 is spring loaded, a proximity sensor (e.g., a Hall effect sensor) may be used to detect when the seat bottom 102 springs back to the folded position, such as the position shown in FIG. 1B. As another example, smart seat 100 can include a pressure sensor located on seat bottom 102 to detect when an occupant leaves the seat. In response to detecting that the occupant has left the seat, smart seat 100 can automatically fold and lock itself. In some embodiments, when an occupant leaves, the seat 100 may automatically activate reserved indicator 116 to let other spectators know that the seat is not available.

User input device 112 may allow a seat occupant to purchase goods or services offered by the venue. For example, in a theatre context, the occupant may use input device 112 to purchase food. The payment card already associated with the seat may be used for a purchase. User input device 112 can include any suitable combination of hardware and/or software configured to display purchasing options and receive user selection input. In some embodiments, user input device 112 may be provided as a touchscreen device. In some embodiments, smart seat 100 can include a switch 120 for activating or deactivating user input device 112. For example, switch 120 may be used to disable a touchscreen display and touch sensors. Switch 120 can be a mechanical or electro-mechanical switch.

Card reader 114 can include hardware and/or software configured to read payment information from payment cards, including debit and credit cards. In some embodiments, card reader 114 may be a magnetic swipe (or "mag swipe")-style card reader. In some embodiments, card reader 114 may be a contactless card reader, such as a Near-Field Communication (NFC) compliant card reader. A contactless card reader can read payment information from a card that is placed nearby or "tapped" on the reader.

Reserved indicator 116 can include a light or other visual indicator located on the seat 100 so as to be conspicuous to nearby spectators. In some embodiments, reserved indicator 116 may include one or more light emitting diodes (LEDs). Reserved indicator 116 may be activated and deactivated by an electronic controller within the seat. For example, indicator 116 can be activated when an occupant leaves their seat. Indicator 116 may be automatically deactivated when the user returns to their seat. In some embodiments, indicator 116 can be automatically deactivated if the seat 100 remains unoccupied for more than a predetermined amount of time (e.g., more than 30 minutes).

Figure 2:
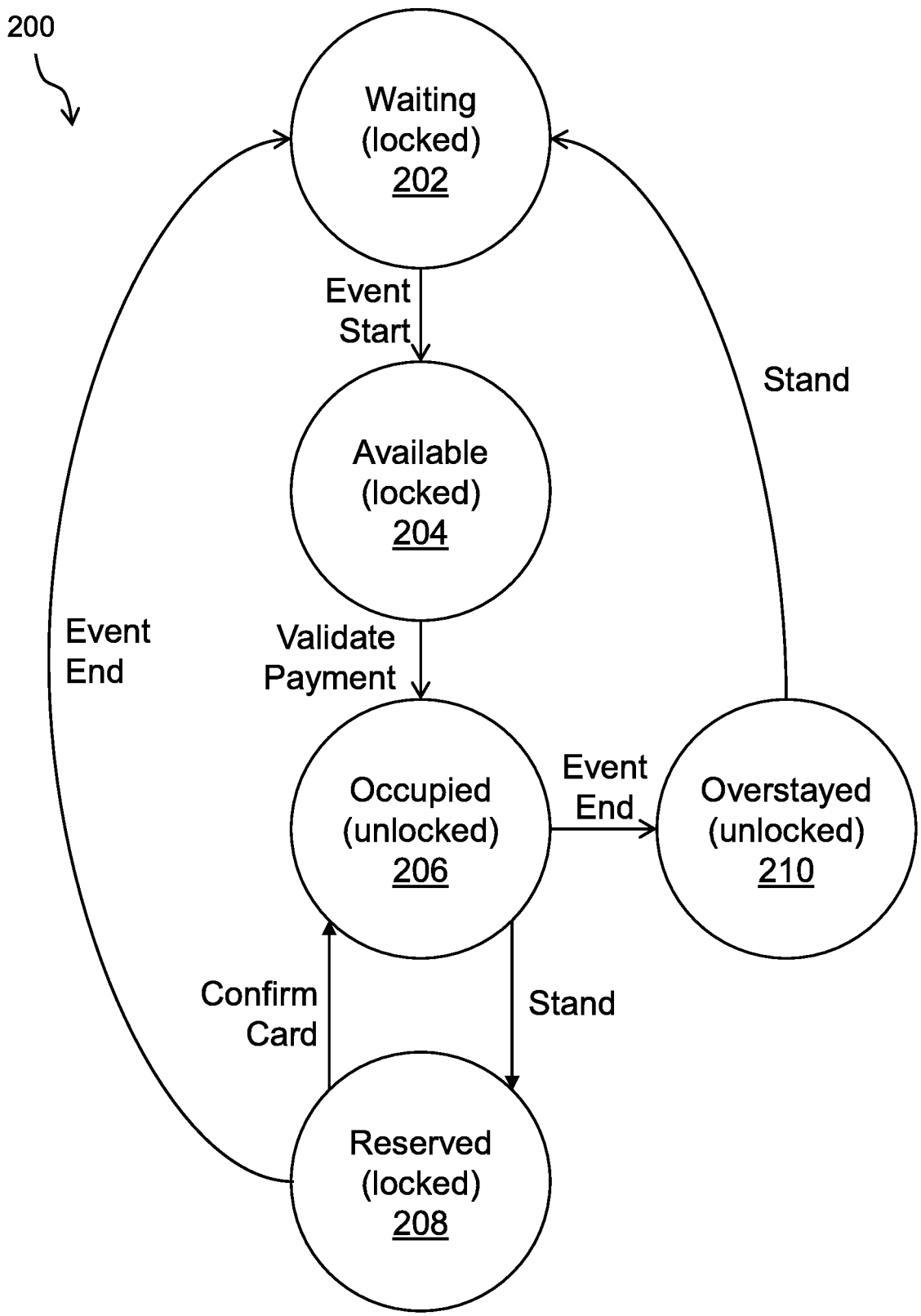
FIG. 2 is a state diagram showing various states that can be associated with a smart seat, according to some embodiments of the present disclosure.

FIG. 2 is a state diagram 200 showing different states that can be associated with a smart seat, according to some embodiments of the present disclosure. In some embodiments, state diagram 200 may correspond to a state machine implemented within a smart seat controller, such as controller 302 of FIG. 3.

In waiting state 202, a smart seat may be locked and will remain locked even if a spectator swipes/taps their payment card on the seat. Waiting state 202 may be used, for example, when there is no event scheduled or between events. In waiting state 202, the seat's locking device (e.g., locking device 118 of FIG. 1B) may be activated and the seat's reserved indicator (e.g., indicator 116 in FIG. 1B) may be deactivated.

When an event is scheduled to start, the seat may transition to available state 204. In some embodiments, the seat (or a server device with which the seat communicates) may have access to the venue's event schedule and use this schedule to determine when events are scheduled to start and stop. In available state 204, the seat is locked but can be unlocked when a valid payment card is swiped/tapped at the seat. In this case, the seat may transition to occupied state 206.

In occupied state 206, the seat is unlocked and available for use, such as shown in FIG. 1A. In some embodiments, the seat may be spring-loaded and, once unlocked, can be manually unfolded by the occupant. In some embodiments, the seat may include a motor that automatically opens the unfolds the seat in occupied state 206.

If the occupant stands up or otherwise leaves the seat, the seat may transition to reserved state 208. In some embodiments, the smart seat can detect when the occupant leaves the seat using, for example, a proximity or pressure sensor. In reserved state 208, the seat may be locked and the seat's reserved indicator can be activated. The seat may remain locked until a payment card is swiped/tapped at the seat and confirmed to be the same card previously used at the seat. In this case, the seat may transition back to occupied state 206.

In some embodiments, the seat may transition to a different state when an event is scheduled to end. For example, as shown in FIG. 2, the seat may transition from occupied state 206 to overstayed state 210 when the event ends. If the occupant leaves a seat in overstayed state 210, the seat may transition back to waiting state 202 such that the occupant is no longer able to return to that seat. Likewise, if the seat's occupant is not sitting when the event ends, the seat may automatically transition from reserved state 208 to the waiting state 202 to prevent them from sitting back down.

A skilled artisan will understand that the smart seat can include various states and/or state transitions other than those depicted in FIG. 2. For example, in some embodiments, a smart seat could automatically transition from reserved state 208 to available state 204 if a person does not return to their seat for more than a predetermined amount of time (e.g., more than 30 minutes).

Figure 3:
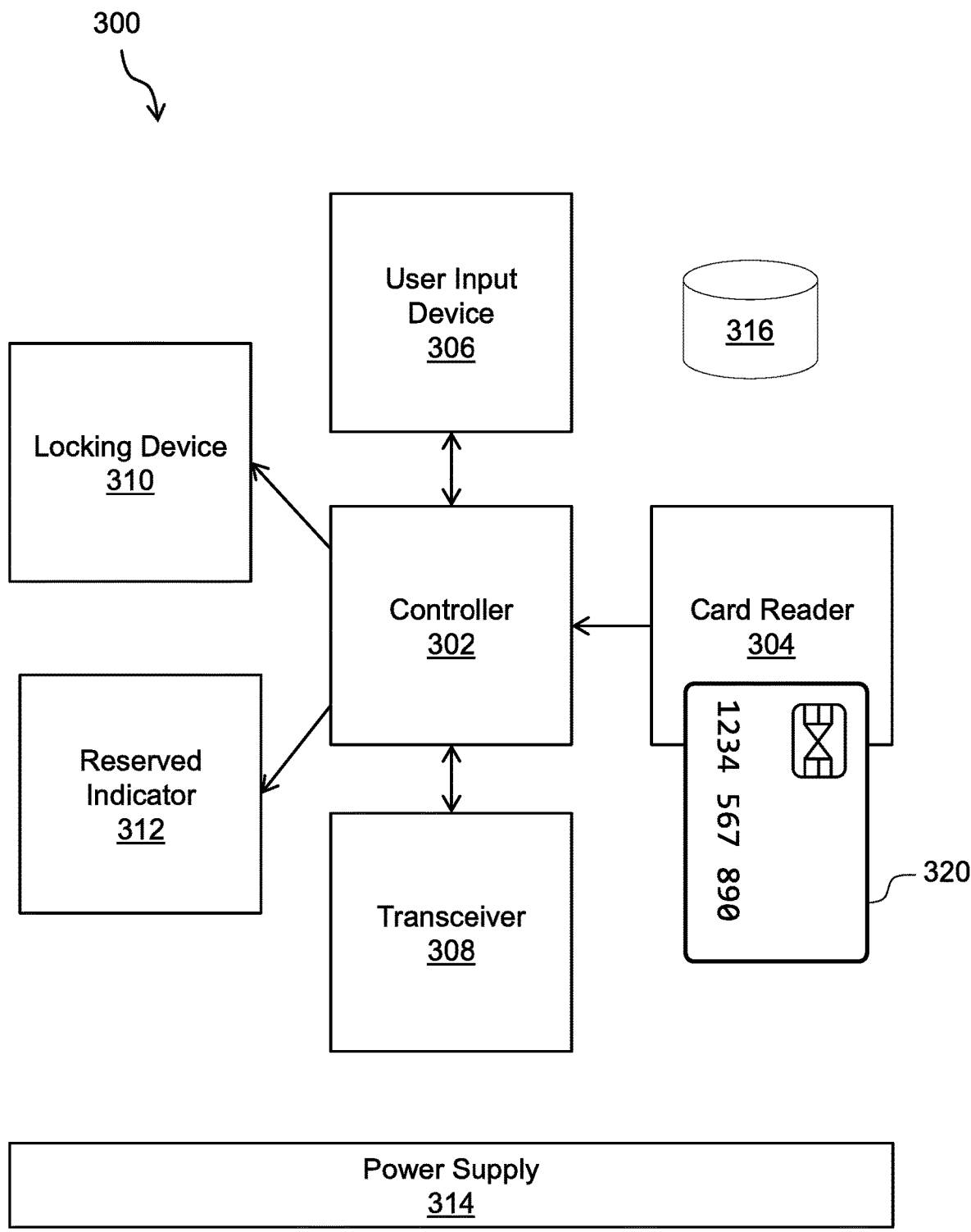
FIG. 3 is a block diagram of system for controlling a smart seat, according to some embodiments of the present disclosure.

FIG. 3 is a block diagram of system for controlling a smart seat, according to some embodiments of the present disclosure. The illustrative system 300 can include a controller 302, a card reader 304, a user input device 306, a locking device 310, a reserved indicator 312, and a power supply 314. System 300 may be located on or near the smart seat that it controls. In some embodiments, system 300 can be fully or partially contained within the smart seat.

In some embodiments, the system 300 include a transceiver 308 to communicate with one or more server devices, or with other smart seats. Transceiver 308 can include any suitable hardware and/or software configured to communicate in the manner disclosed herein. In some embodiments, transceiver 308 can include a wireless network adapter, for example a WiFi or Bluetooth adapter. In some embodiments, transceiver 308 can include a wired network adapter, such as an Ethernet adapter. In some embodiments, the system 300 can use transceiver 308 to transmit payment information to a remote payment processing system for validation or confirmation.

Card reader 304 may be the same as similar to card reader 114 described above in the context of FIG. 1A. For example, card reader 304 may be configured to read payment information from a payment card 320 that is swiped or tapped on the reader 114. User input device 306 may be the same as or similar to user input device 112 described above in the context of FIG. 1A. For example, input device 306 may include a touchscreen device. Locking device 310 may be the same as or similar to locking device 118 described above in conjunction with FIG. 1B. For example, locking device 310 may be an electromagnetic or electromechanical locking device. Reserved indicator 312 may be the same as or similar to reserved indicator 116 described above in conjunction with FIG. 1B. For example, reserved indicator 312 may include a light that can be illuminated to indicate that the smart seat is reserved.

Power supply 314 may be electrically coupled to provide power to the various system components, such as the controller 302, card reader 304, user input device 306, transceiver, and/or locking device 310. In some embodiments, power supply 314 may include one or more batteries. In some embodiments, power supply 314 may be coupled to an electrical outlet.

Controller 302 can include hardware and/or software configured to receive, as input, signals, data, and other information from the system components and to generate, as output, control signals and commands. In some embodiments, controller 302 can receive payment information from card reader 304 and send the payment information, via transceiver 308, to a server device for validation. If the payment information is valid, then controller 302 can generate and send a signal/command to locking device 310 to cause the seat to unlock. In some embodiments, a smart seat can include a proximity or pressure sensor (not shown) and controller 302 may process signals received from the sensor to detect when an occupant leaves the seat. In some embodiments, controller 302 may track which state the seat using, for example, the state machine described above in the context of FIG. 2. In some embodiments, controller 302 may be configured to activate/deactivate the locking device 310 and reserved indicator 312 based on the seat's current state.

In some embodiments, controller 302 may implement at least a portion of the processing described below in the context of FIG. 5. In some embodiments, controller 302 may be provided as a general purpose processing device, such as device 600 described below in the context of FIG. 6. In some embodiments, system 100 may include a storage device 316 that can be used, for example, to store payment card information associated with the smart seat.

Figure 4:
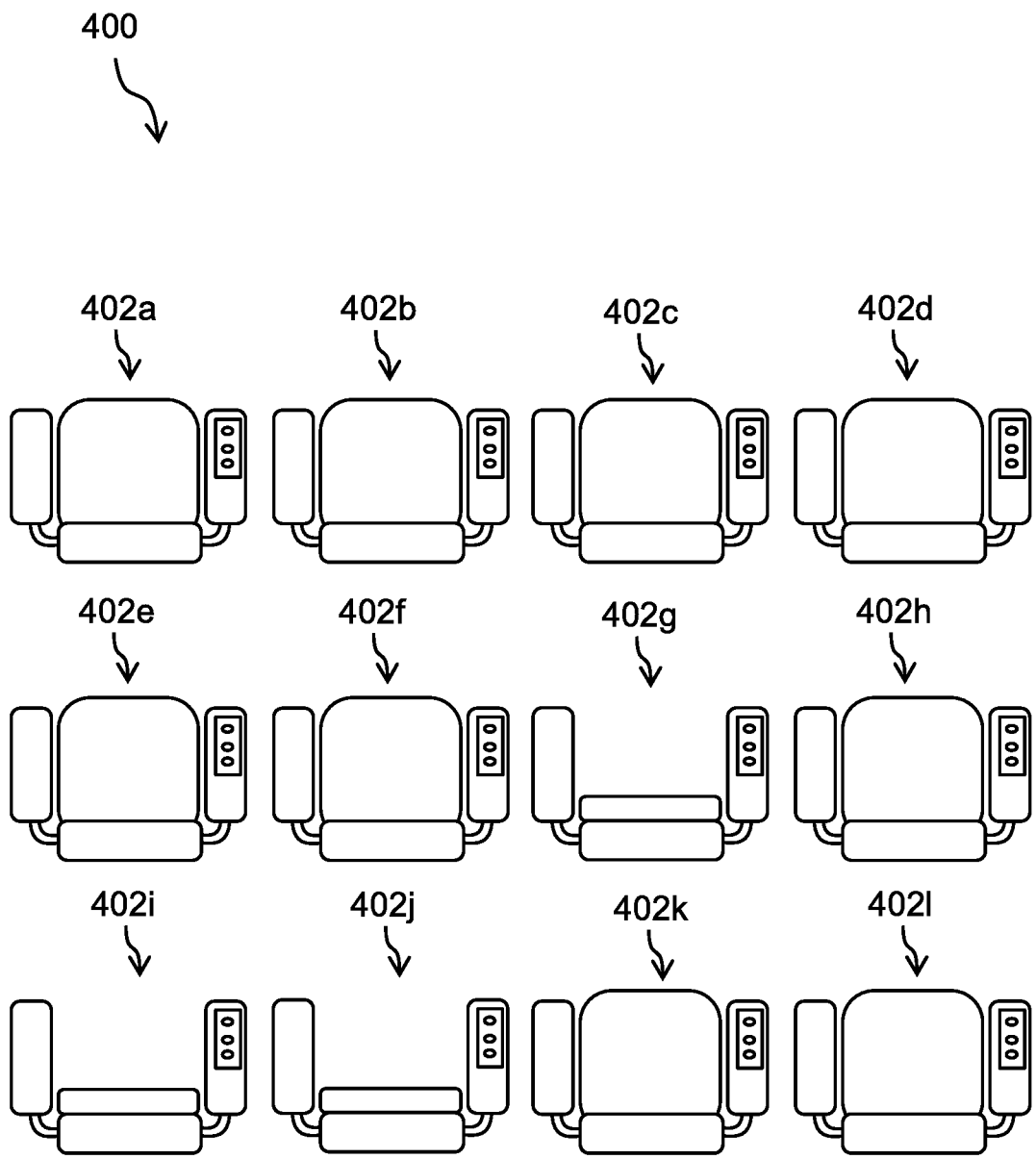
FIG. 4 is a diagram of a venue having a plurality of smart seats, according to some embodiments of the present disclosure.
Figure 4:
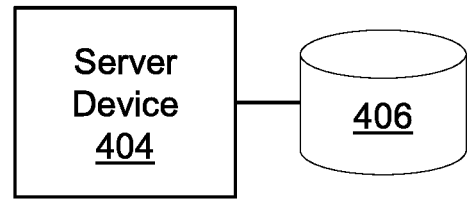

FIG. 4 shows how smart seats can be arranged in a venue, according to some embodiments of the present disclosure. An illustrative venue 400 can include a plurality of smart seats 402a, 402b, . . . , 402l (402 generally) arranged, for example, in one or more rows. Although the example of FIG. 4 shows twelve (12) seats 402a-402l arranged in three (3) rows, a skilled artisan will understand that the systems and methods disclosed herein can be used with generally any number and arrangement of smart seats. Each smart seat 402 can have an associated state, such as the available 204, occupied 206, or reserved 208 state discussed above in the context of FIG. 2. In the particular example of FIG. 4, each of seats 402g, 402i, and 402j may be either available or reserved (and thus locked), while the remaining seats may be occupied (and thus unlocked).

A server device 404 may be communicably coupled to each of the smart seats 402 via, for example, wired or wireless network links. The server device 404 can include hardware and/or software configured to manage and track the venue's seating. For example, server device 404 may be configured to track the state of each smart seat 402. When a smart seat's state changes, the seat 402 may send the new state to server device 404. Thus, at any point in time, server device 404 may know which seats are, for example, available, occupied, reserved, locked, and unlocked. In some embodiments, server device 404 may store a schedule of events for the venue 400. When an event is scheduled to start or end, server device 404 may send notifications to each of the smart seats 402. In response, the seats 402 may automatically lock or unlock themselves. In some embodiments, server device 402 may validate payment cards. For example, when a spectator swipes/taps a payment card on a smart seat 402, that seat may transmit the card information to server device 404, which in turn can send the payment information to an external payment processing system for validation.

In some embodiments, server device 404 may include or otherwise has access to a storage device 406. The storage device 406 can be configured to store payment information or state information associated with each of the venue's smart seats 402. Within the server device 404 and/or storage device 406, each seat within a venue 400 may be assigned a unique identifier. When an occupant leaves their seat, they may be required to swipe/tap the same payment card before they are allowed to sit back down. In this case, the smart seat 402 may transmit the card information (along with the seat's unique identifier) to server device 404, which can compare the card information against payment information stored in the storage device 406 to confirm that the same card was used.

In some embodiments, server device 404 may include an administrative (or "admin") interface via which the venue owner or operate can monitor and manage the venue's seating. For example, an operator could use the admin interface to manage the venue's event schedule, monitor the venue's occupancy rate, or track revenue collected via the smart seats 402. The admin interface can include controls for adjusting the price of seats 402 for a particular event. In some embodiments, server device 404 may be configured to dynamically adjust seat prices based on the number of seats already reserved for a given event, weather conditions, or other factors.

In some embodiments, an AR app can communicate with server device 404 to determine, for example, which seats are available or unavailable and then display this information to the user. In some embodiments, server device 404 may be part of a Software-as-a-Service (SaaS) system that manages seating for multiple different venues. Thus, for example, server device 404 may represent one or more computing nodes in a cloud computing system.

Figure 5:
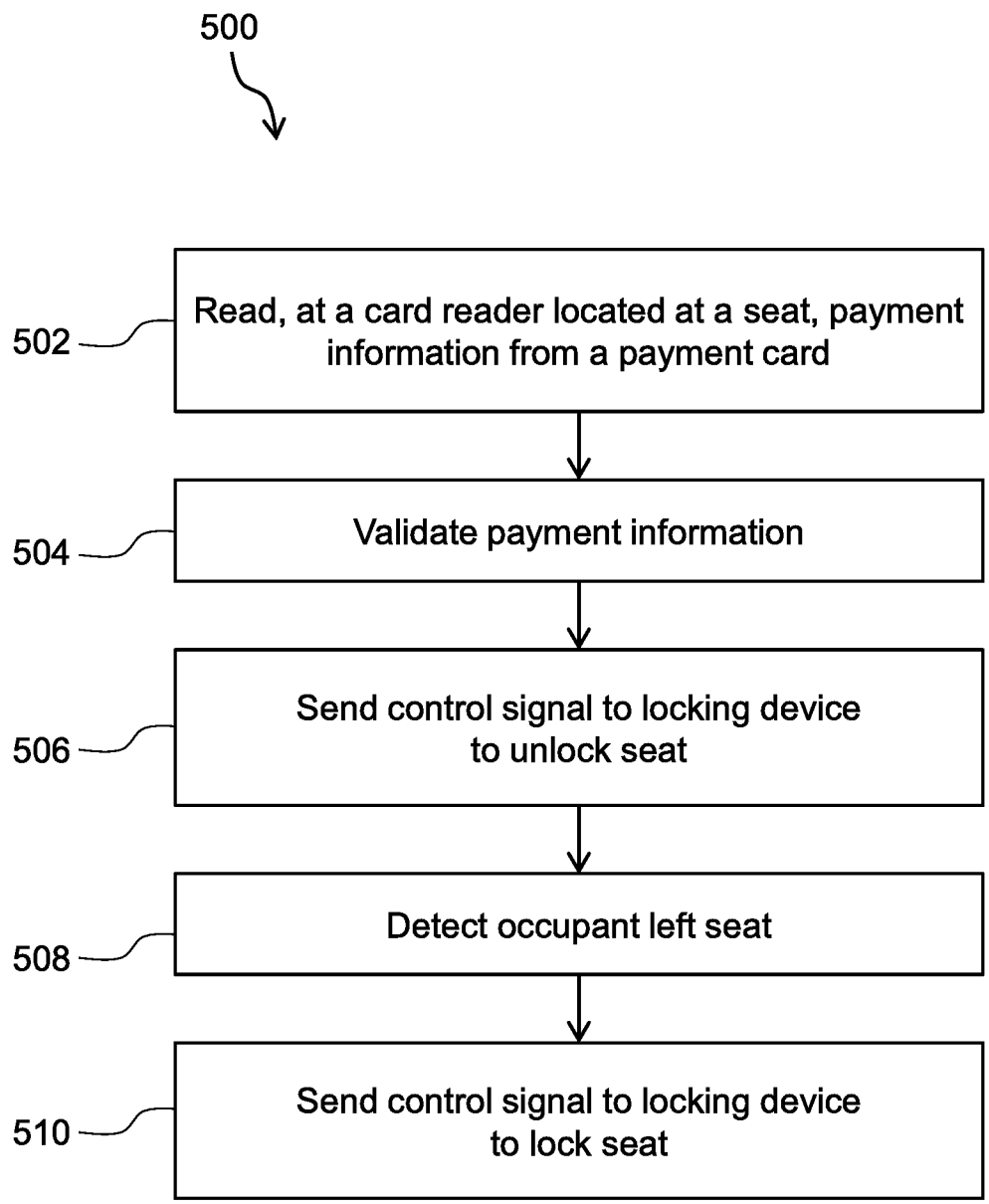
FIG. 5 is a flow diagram of an illustrative method for controlling a smart seat, according to some embodiments of the present disclosure.

Referring to FIG. 5, an illustrative method 500 may be used to control a smart seat, according to some embodiments of the disclosure. At least a portion of method 500 can be implemented within a smart seat controller, such as controller 302 of FIG. 3.

At block 502, payment information can be read from a payment card using a card reader located on a smart seat. In some embodiments, the card reader may be a contactless card reader onto which the card can be tapped. In some embodiments, the card reader may be a mag swipe-style reader. At block 504, the payment information may be validated. In some embodiments, the payment information may be validated by a payment processing system for validation. In some embodiments, the payment information may be read from a different type of payment device, such as a phone or other transaction device.

At block 506, a control signal can be sent to a locking device to unlock the seat. For example, referring to FIG. 3, controller 302 may generate and send a control signal to locking device 310. In some embodiments, the locking device can be an electromechanical or electromagnetic locking device.

At block 508, a sensor on the seat can be used to detect that the occupant left the seat. In some embodiments, the seat may be spring loaded and, when the occupant leaves the seat, a proximity sensor may be used to detect that the seat bottom rotated upwards to the backrest.

At block 510, a control signal can be sent to a locking device to lock the seat. For example, referring to FIG. 3, a controller 302 may generate and send a control signal to locking device 310. In some embodiments, a motor on the seat may be used to fold the seat into a locked position in response to detecting the occupant left. In some embodiments, the smart seat may activate a light or other visual indicator to indicate that the seat is reserved.

Figure 6:
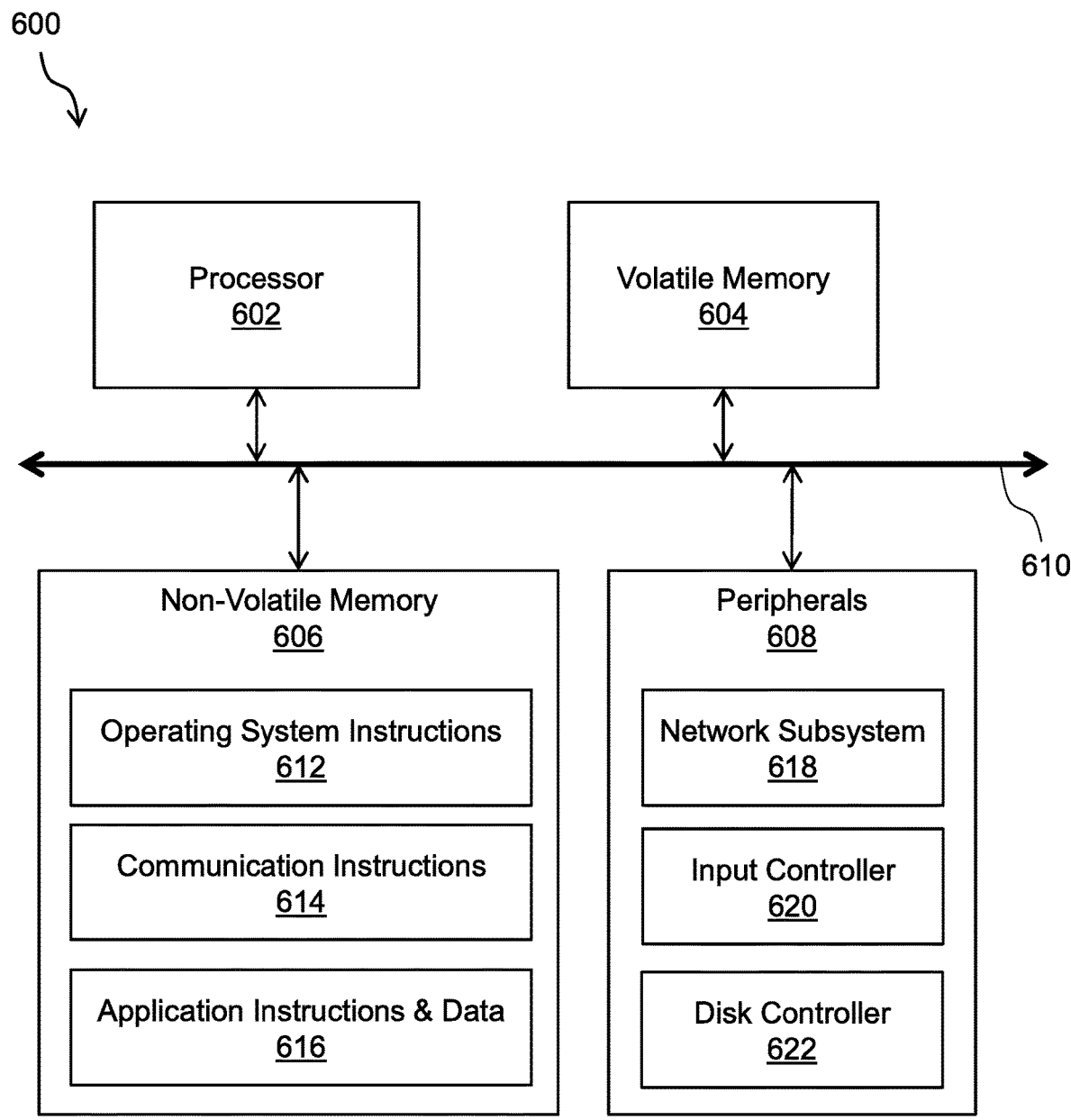
FIG. 6 is a block diagram of a server device, according to some embodiments of the present disclosure.

FIG. 6 shows an illustrative server device 600 that may implement various features and processes as described herein. The server device 600 may be implemented on any electronic device that runs software applications derived from compiled instructions, including without limitation personal computers, servers, smart phones, media players, electronic tablets, game consoles, email devices, etc. In some implementations, the server device 600 may include one or more processors 602, volatile memory 604, nonvolatile memory 606, and one or more peripherals 608. These components may be interconnected by one or more computer buses 610.

Processor(s) 602 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 610 may be any known internal or external bus technology, including but not limited to ISA, EISA, PCI, PCI Express, NuBus, USB, Serial ATA or FireWire. Volatile memory 604 may include, for example, SDRAM. Processor 602 may receive instructions and data from a read-only memory or a random-access memory or both. The essential elements of a computer may include a processor for executing instructions and one or more memories for storing instructions and data.

Non-volatile memory 606 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 606 may store various computer instructions including operating system instructions 612, communication instructions 614, and application instructions and data 616. Operating system instructions 612 may include instructions for implementing an operating system (e.g., Mac OS®, Windows®, or Linux). The operating system may be multi-user, multiprocessing, multitasking, multithreading, real-time, and the like. Communication instructions 614 may include network communications instructions, for example, software for implementing communication protocols, such as TCP/IP, HTTP, Ethernet, telephony, etc. Application instructions and data 616 can include instructions and data for controlling and managing smart seats, according to various embodiments of the disclosure discussed here.

Peripherals 608 may be included within the server device 600 or operatively coupled to communicate with the sever device 600. Peripherals 608 may include, for example, network interfaces 618, input devices 620, and storage devices 622. Network interfaces may include for example an Ethernet or WiFi adapter. Input devices 620 may be any known input device technology, including but not limited to a keyboard (including a virtual keyboard), mouse, track ball, and touch-sensitive pad or display. Storage devices 622 may include one or more mass storage devices for storing data files; such devices include magnetic disks, such as internal hard disks and removable disks; magneto-optical disks; and optical disks.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for controlling access to a seat based on payments, the method comprising:

reading, at a card reader located at a seat, first payment information from a first payment card;
validating, by a controller located in the seat, the controller in communication with the card reader, the first payment information;
sending, by the controller, a first control signal to a locking device to unlock the seat;
detecting, by the controller, that an occupant left the seat; and in response to detecting that the occupant left the seat, sending, by the controller, a second control signal to the locking device to lock the seat;
determining, by the controller, that a first event is scheduled to end by receiving a notification from a remote server device;
in response to determining that the first event is scheduled to end, changing, by the controller, the state of the seat to a waiting state, wherein the seat is locked and unavailable while in the waiting state;
determining, by the controller, that a second event is scheduled to start by receiving a further notification from the remote server device; and
in response to determining that the second event is scheduled to start, changing, by the controller, the state of the seat to an available state.

2. The method of claim 1 wherein validating the first payment information comprises:
transmitting the first payment information to a server device.

3. The method of claim 1 wherein sending the first control signal to the locking device comprises:
generating an electronic control signal by a controller located at the seat.

4. The method of claim 1 wherein sending the first control signal to the locking device comprises:
sending the lock control signal to an electromechanical locking device coupled to the seat.

5. The method of claim 1 wherein sending the first control signal to the locking device comprises:
sending the lock control signal to an electromagnetic locking device coupled to the seat.

6. The method of claim 1 wherein reading the first payment information comprises:
reading the first payment information using a contactless card reader.

7. The method of claim 1 comprising:
in response to validating the first payment information, notifying a server device that the seat is occupied.

8. The method of claim 1 comprising:
in response to detecting that an occupant left the seat, activating a visual indicator to indicate that the seat is reserved.

9. The method of claim 1 comprising:
in response to validating the first payment information, sending a command to a motor located on the seat to cause the seat to unfold.

10. The method of claim 1 comprising:
reading second payment information at the card reader located at the seat; and
sending a third control signal to unlock the seat in response to determining that the second payment information is associated with the first payment card.

11. A method for controlling access to a seat based on payments, the method comprising:
setting, by a controller located in the seat, a state of the seat to an available state;
reading, at a card reader located at the seat, the card reader in communication with the controller, payment information from a payment card;
validating, by the controller, the payment information;
in response to validating the payment information, changing, by the controller, the state of the seat to an occupied state;
detecting, by the controller, that an occupant left the seat;
in response to detecting that the occupant left the seat, changing, by the controller, the state of the seat to a reserved state;
determining, by the controller, that a first event is scheduled to end by receiving a notification from a remote server device;
in response to determining that the first event is scheduled to end, changing, by the controller, the state of the seat to a waiting state, wherein the seat is locked and unavailable in the waiting state;
determining, by the controller, that a second event is scheduled to start by receiving a further notification from the remote server device; and
in response to determining that the second event is scheduled to start, changing, by the controller, the state of the seat to the available state.

12. The method of claim 11 wherein the seat comprises a locking device, wherein the locking device is activated when the state is the available state or the reserved state.

13. The method of claim 11 wherein the seat comprises a visual indicator, wherein the visual indicator is activated when the state is the reserved state.

14. A system for controlling access to a seat based on payments, the system comprising:
a card reader attached to a seat, the card reader configured to read payment information from payment cards;
a locking device configured to lock the seat;
a sensor configured to detect when the seat is occupied; and
a controller configured to:
receive first payment card information from the card reader;
validate the first payment information;
send a first control signal to the locking device to unlock the seat;
detect, using the sensor, that an occupant left the seat;
in response to detecting that the occupant left the seat, sending a second control signal to the locking device to lock the seat;
determine that a first event is scheduled to end by receiving a notification from a remote server device;
in response to determining that the first event is scheduled to end, change the state of the seat to a waiting state, wherein the seat is locked and unavailable in the waiting state;
determine that a second event is scheduled to start by receiving a further notification from the remote server device; and
in response to determining that the second event is scheduled to start, change the state of the seat to the available state.

15. The system of claim 14 comprising:
a touchscreen device configured to display products or services that can be purchased using the validated first payment information.

16. The system of claim 15 comprising:
a switch configured to disable the touchscreen device.

17. The system of claim 14 wherein the locking device is one of an electromechanical locking device or an electromagnetic locking device.

18. The system of claim 14 wherein the controller is configured to:
   receive second payment card information from the card reader; and
   send a third control signal to unlock the seat in response to determining that the second payment information is the same as the first payment information.

* * * * *